United States Patent
Carr et al.

(10) Patent No.: US 6,774,093 B2
(45) Date of Patent: Aug. 10, 2004

(54) HIGH VISCOSITY SYNTHETIC ESTER LUBRICANT BASE STOCK

(75) Inventors: Dale D. Carr, Morristown, NJ (US); Michael A. McHenry, Washington, NJ (US); Jeremy P. Styer, Sayreville, NJ (US)

(73) Assignee: Hatco Corporation, Fords, NJ (US)

( * ) Notice: Subject to any disclaimer, the term of this patent is extended or adjusted under 35 U.S.C. 154(b) by 0 days.

(21) Appl. No.: 10/194,413

(22) Filed: Jul. 12, 2002

(65) Prior Publication Data

US 2004/0092410 A1 May 13, 2004

(51) Int. Cl.⁷ ............................................ C10M 105/38
(52) U.S. Cl. ........................................ 508/485; 252/68
(58) Field of Search .............................. 508/485; 252/68

(56) References Cited

U.S. PATENT DOCUMENTS

| | | | | |
|---|---|---|---|---|
| 3,670,013 A | * | 6/1972 | Lelbfried .................... | 560/263 |
| 5,211,884 A | * | 5/1993 | Bunemann et al. ......... | 508/485 |
| 5,374,366 A | * | 12/1994 | Nakahara et al. ........... | 508/492 |
| 5,470,497 A | * | 11/1995 | Schlosberg et al. .......... | 252/68 |
| 5,494,597 A | * | 2/1996 | Krevalis et al. .............. | 252/68 |
| 5,895,778 A | * | 4/1999 | McHenry et al. ........... | 508/495 |
| 6,153,118 A | * | 11/2000 | Hasegawa et al. ............ | 252/68 |
| 6,267,906 B1 | * | 7/2001 | Schnur et al. ................ | 252/68 |
| 6,350,392 B1 | * | 2/2002 | Schnur ........................ | 252/68 |
| 6,444,626 B1 | * | 9/2002 | McHenry et al. ........... | 508/495 |
| 6,551,523 B1 | * | 4/2003 | Schnur ........................ | 252/68 |
| 6,551,968 B2 | * | 4/2003 | McHenry et al. ........... | 508/485 |

* cited by examiner

Primary Examiner—Ellen M McAvoy
(74) Attorney, Agent, or Firm—Reed Smith LLP; Michael I. Wolfson

(57) ABSTRACT

A high viscosity synthetic ester base stock of about ISO 68 to 400 is formed from a neopentylpolyol condensed with at least one monocarboxylic acid selected from the group consisting of linear acids having between 4 to 10 carbon atoms and branched chain acids having from 5 to 10 carbon atoms in an excess of hydroxyl to carboxylic acid groups to form a partial polyneopentylpolyol ester that is further reacted with the same or similar acid to form a high viscosity polyneopentylpolyol ester. Lubricants formed from the base stocks have satisfactory miscibility with standard highly or fully fluorinated refrigeration fluids.

20 Claims, No Drawings

HIGH VISCOSITY SYNTHETIC ESTER LUBRICANT BASE STOCK

BACKGROUND OF THE INVENTION

This invention relates to synthetic ester lubricant base stocks, and more particularly to high molecular weight synthetic ester lubricant base stocks formed from neopentylpolyols and monocarboxylic acids or mixtures of monocarboxylic acids suitable for use in industrial refrigeration systems.

It is well known that chlorofluorocarbons previously utilized as propellants in aerosols and as refrigeration fluids are no longer used due to the adverse impact on the earth's ozone layer. Efforts to eliminate the use of chlorofluorocarbons has led to the development of alternative fluids that are highly or fully fluorinated hydrocarbons.

Working refrigeration fluids generally include a minor amount of lubricant. Typically, the refrigeration fluids include between about 5 to 15 or 20 parts by weight of lubricant with the balance being the fluorocarbon. In chlorofluorocarbon systems, lubricants have been mineral oils which are fully miscible with the chlorofluorocarbons. However, such lubricants are not miscible with the highly or fully fluorinated hydrocarbons such as 1,1,1,2-tetrafluoroethane, commonly known as HFC-134a. Other chlorine-free fluorocarbons include a hydrofluorocarbon (HFC) having 1 to 3 carbon atoms and preferably 1 to 2 carbon atoms, for example, difluoromethane (HFC-32), trifluoromethane (HFC-23), pentafluoroethane (HFC-125), 1,1,2,2-tetrafluoroethane (HFC-134), 1,1,1-trifluoroethane (HFC-143a), 1,1-difluoroethane (HFC-152a) or a mixture of two or more kinds of these HFCs.

It has been found that certain carboxylic esters of polyhydroxy compounds are fully miscible with the highly or fully fluorinated fluids. An early publication describing such lubricants is European Patent EP 0 422 185 B1. Lubricants of the type disclosed are low viscosity fluids of the type utilized in home window air conditioning units and automotive air conditioning units. The lubricants are prepared by the condensation of pentaerythritol and monocarboxylic acids containing between about 6 to 8 carbon atoms. This generally produces an ester having a viscosity at 40° C. of between about 17.5 to about 52.0 cSt. Such lubricants are also disclosed in U.S. Pat. No. 5,964,581.

Larger industrial refrigeration units of the type utilized in building and factory cooling units call for refrigeration fluids including lubricants having significantly higher viscosity in the ISO 100 to 350 range (100 to 350 centistokes at 40° C.). Typically such higher viscosity lubricants would be formed from dipentaerythritol and higher molecular weight carboxylic acids. This would include lubricant base stocks having a viscosity between about 68 to 400 cSt at 40° C. Alternatively, dicarboxylic acids can be utilized along with the monocarboxylic acids to form complex esters when reacted with a polyol, however these esters tend to be less stable than polyol esters of monocarboxylic acid alone. Production of higher viscosity lubricants is generally not possible from a monopentaerythritol starting material. It is preferable to use monopentaerythritol, however, because the cost of monopentaerythritol is much lower than the cost of dipentaerythritol.

Accordingly, it is desirable to provide a synthetic ester lubricant base stock having a viscosity between about ISO 68 to 400 based on condensation of monopentaerythritol and monocarboxylic acids.

SUMMARY OF THE INVENTION

Generally speaking, in accordance with the invention, high viscosity synthetic ester lubricant base stocks based on polyneopentylpolyol esters suitable for use with high-fluorine containing refrigeration fluids are provided. The polyneopentylpolyol esters are formed by reacting a neopentylpolyol having less than 10 carbon atoms with at least one monocarboxylic acid selected from the group of linear acids having from 4 to 10 carbon atoms, and branched chain acids having from 5 to 10 carbon atoms. The neopentylpolygls include pentaerythritol, trimethylolpropane, trimethylolethane, neopentyl glycol and the like. A preferred acid is a mixture of a linear acid and a branched acid in a mole ratio of between 5:1 to 1:5, preferably between about 1:1 to 1:3 and most preferably between 1:3 to 1:4.

The polyol and acid are first reacted in the presence of an excess of hydroxyl groups to form a partial polyneopentylpolyol ester of desired viscosity. Then an excess of monocarboxylic acid or acid mixture is added to the reaction mixture and the esterification reaction is continued to yield an ester having a viscosity in the range of 68 to 400 cSt at 40° C.

Optionally, finished esters can be prepared to a higher viscosity than desired. These can then be blended with a lower viscosity neopentylpolyol ester to achieve the desired target viscosity. Significant economic benefits are realized by this approach to building viscosity in the ISO range of between about 68 to 400. The base stocks are then blended with a refrigerant lubricant additive package to form the lubricant. The additive packages are well known in the art and include antioxidants, anti-wear agents, metal pacifiers, friction modifiers and the like.

In a preferred embodiment of the invention, the starting polyol is pentaerythritol and the acid is a mixture of valeric acid ($C_5$ acid) and 3,5,5-trimethylhexanoic acid (iso$C_9$ acid). It has been found that these esters are particularly suitable for use in synthetic refrigeration fluids as they provide good miscibility with highly or fully fluorinated refrigeration fluids over a broad temperature range.

Accordingly, it is an object of the invention to provide a high viscosity synthetic ester base stock having satisfactory miscibility with refrigeration fluids.

Another object of the invention is to provide an improved high viscosity synthetic ester base stock formed from a neopentylpolyol at reduced costs.

A further object of the invention is to provide a high molecular weight synthetic ester base stock having a high ISO grade in the range of about 68 to 400 based on a neopentylpolyol.

Yet another object of the invention is to provide a method for preparing a high viscosity synthetic ester base stock from a neopentylpolyol and an acid or acid mixture consisting of monocarboxylic acids.

Yet a further object of the invention is to provide a high viscosity synthetic ester base stock formed from monopentaerythritol and an acid mixture of valeric acid and iso$C_9$ acid.

Still other objects and advantages of the invention will in part be obvious and will in part be apparent from the specification. The invention accordingly comprises a composition of matter possessing the characteristics, properties and the relation of components which will be exemplified in the compositions hereinafter described, and the scope of the invention will be indicated in the claims.

DESCRIPTION OF THE PREFERRED EMBODIMENTS

The high viscosity synthetic ester lubricant base stocks prepared in accordance with the invention are esters or blends of esters of certain polyneopentylpolyols. These esters provide good miscibility with highly or fully fluorinated refrigeration working fluids and are obtained at significant economic benefit.

In the preferred embodiments of the invention, the base stock is a blend of esters which form the reaction product of a two step process. In the initial step a neopentylpolyol having less than 10 carbon atoms and preferably from 5 to 8 carbon atoms is reacted with an acid or acid mixture of linear $C_4$–$C_{10}$ acid and/or branched $C_5$–$C_{10}$ acid in the presence of an excess of hydroxyl groups to carboxyl groups in the presence of an acid catalyst to form a partial polyneopentylpolyol ester mixture. When the anticipated water of reaction has been removed from the reaction vessel to yield a product of desired viscosity, the resulting partial polyneopentylpolyol ester is then reacted with an excess of an acid or acid mixture that can vary or be the same acid or acid mixture used in the initial step to yield the high viscosity ester product.

The neopentylpolyol utilized to prepare compositions in accordance with the invention preferably is at least one neopentylpolyol represented by the structural formula:

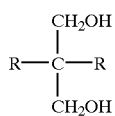

wherein each R is independently selected from the group consisting of $CH_3$, $C_2H_5$ and $CH_2OH$. Examples of such a neopentylpolyol include pentaerythritol, trimethylolpropane, trimethylolethane, neopentyl glycol and the like. In some embodiments of this invention, the neopentylpolyol comprises only one such neopentylpolyol. In other embodiments it comprises two or more such neopentylpolyols. When the neopentylpolyol is pentaerythritol, the polypentaerythritol moiety of the reaction product includes pentaerythritol, dipentaerythritol, tripentaerythritol, tetrapentaerythritol, etc.

The acid or acid mixture includes a linear monocarboxylic acid and/or a branched chain monocarboxylic acid. The linear acid is one having from 4 to 10 carbon atoms and the branched acid has from 5 to 10 carbon atoms. Preferably, the acid is valeric acid ($C_5$ acid) or a mixture of acids of valeric acid and 3, 5, 5-trimethylhexanoic acid (iso$C_9$ acid).

When an acid mixture is used, preferably the linear acid is valeric acid present in amounts between about 15 to 35 mole percent and the branched acid is iso$C_9$ acid present between about 65 to 85 mole percent. In a most preferred embodiment of the invention the valeric acid is present between about 20 to 25 mole percent and the iso-$C_9$ acid between about 75 to 80 mole percent.

The initial stage of the reaction to form the polyneopentylpolyol esters is conducted in the manner described by Leibfried in U.S. Pat. No. 3,670,013 and in commonly assigned U.S. Pat. No. 5,895,778. The descriptions of both patents are incorporated herein by reference. Here, when pentaerythritol is the neopentylpolyol, a reaction mixture of pentaerythritol (272 w) and valeric acid (217 v) is placed into a reactor with extra valeric acid (38 v) in a receiver to assure a constant level of valeric acid in the reaction mixture. The mixture is heated to a temperature of 171° C. and concentrated sulfuric acid (1.0 w) diluted with water (2 v) is added. The reaction mixture is heated to 192° C. and maintained until 50.5 v of water is removed after about 1.4 hours. The Leibfried analysis of the product shows pentaerythritol, dipentaerythritol, tripentaerythritol and tetrapentaerythritol moieties at weight ratios of 34:38:19:8.

The initial concentration of monocarboxylic acid material in the reaction mixture is such as to provide an initial mole ratio of carboxyl groups to hydroxyl groups in a range from about 1:4 to about 1:2.

In the present case, when the polyol is pentaerythritol, the polyol and carboxylic acid or acid mixture are charged in a mole ratio of about 1:1 to 1:3 with a preferred starting ratio of about 1:2. This mixture is reacted using an effective amount of an acid catalyst material as described in the Leibfried patent.

The reaction is continued until the desired quantity of water is removed from the reaction mixture. This is determined by experimentation and may be estimated by calculating the expected amounts of water of reaction. At this point when the starting neopentylpolyol is pentaerythritol, the mixture includes partial esters of pentaerythritol, dipentaerythritol, tripentaerythritol, tetrapentaerythritol and the like. Optionally, the acid catalyst may be neutralized with alkali. In order to complete the esterification of the partial esters, an excess of an acid or acid mixture and optionally an esterification catalyst as is well known in the art is added to the reaction mixture which is then heated, water of reaction removed and acid returned to the reactor. Optionally, the product can be isolated without completing the esterification of the remaining hydroxyl groups, or the esterification can be carried out to some desired extent other than to completion.

The acid catalyst is at least one acid esterification catalyst. Examples of acid esterification catalysts include mineral acids, preferably, sulfuric acid, hydrochloric acid, and the like, acid salts such as, for example, sodium bisulfate, sodium bisulfite, and the like, sulfonic acids such as, for example, benzenesulfonic acid, toluenesulfonic acid, polystyrene sulfonic acid, methylsulfonic acid, ethylsulfonic acid, and the like. The reaction mixture is heated to between about 150° and 250° C. while withdrawing acid vapor and water vapor to yield the polypentaerythritol partial ester product.

Prior to esterifying the partial esters, the intermediate product will include a variety of condensation products of the neopentylpolyol. When pentaerythritol is the neopentylpolyol, the reaction mixture will include significantly more pentaerythritol than the 10 to 15 weight percent generally present in commercially available dipentaerythritol. Depending on the initial ratio of carboxyl groups to hydroxyl groups and selection of reaction conditions, the partial ester product may include the following components in the weight ranges specified in the following table.

| Pentaerythritol Moiety | Weight Percent |
| --- | --- |
| Pentaerythritol | 30 to 45 |
| Dipentaerythritol | 30 to 45 |
| Tri/tetrapentaerythritol | 20 to 35 |
| Others | 3 to 15 |

In the initial step of the reaction an excess of hydroxyl groups to monocarboxylic acid groups is present to form the partial esters of the neopentylpolyol, such as partial esters of pentaerythritol, dipentaerythritol, tripentaerythritol, tetrapentaerythritol, etc. The excess of hydroxyl groups is necessary to promote the polymerization of the partial esters. The molar ratio of acid or acid mixture to the polyol can be varied depending on the desired rate of reaction, degree of condensation and the ultimate desired viscosity of the lubricant. After formation of the partial esters, generally, a 10 to 25 percent excess, with respect to hydroxyl groups, of an acid or acid mixture is added to the reactor and heated. Water of reaction is collected during the reaction while the acids are returned to the reactor. The use of vacuum will facilitate the reaction. When the hydroxyl value is reduced to a sufficiently low level, the bulk of the excess acid is removed by vacuum distillation. Any residual acidity is neutralized with an alkali. The resulting polyneopentylpolyol ester is dried and filtered as described in Example 1 below.

The invention will be better understood with references to the following examples. These examples are presented for purposes of illustration only, and are not intended to be construed in a limiting sense.

The reactor in each preparatory example is equipped with a mechanical stirrer, thermocouple, thermoregulator, Dean Stark trap, condenser, nitrogen sparger, and vacuum source. The esterification may or may not be carried out in the presence of esterification catalysts, which are well known in the art.

EXAMPLE 1

To a reactor as described above was charged 392 grams pentaerythritol (2.88 moles), 122 grams valeric acid (1.20 moles), 686 grams isoC$_9$ acid (4.34 moles) and a strong acid catalyst as described in Leibfried. The expected water of esterification from the initial charge is 5.54 moles or about 100 grams.

The mixture was heated to a temperature of about 170° C. and water of reaction was removed and collected in the trap. Vacuum was applied at temperature to obtain a reflux thereby removing the water and returning the acid collected in the trap to the reactor.

The temperature was maintained at 170° C. with vacuum until 125 ml of water was collected. At this point the reaction mixture consisted of partial esters of pentaerythritol, dipentaerythritol, tripentaerythritol, tetrapentaerythritol, etc. After cooling to about 134° C., 85 grams C$_5$ acid and 480 grams isoC$_9$ acid were added, along with an amount of alkali sufficient to neutralize the acid catalyst.

Heat was applied to raise the temperature of the reaction mixture to 240° C., which was maintained for about 8 hours. At this time a total of 173 ml water was collected and the hydroxyl value was 6.4 mgKOH/g.

The reaction was then held at 240° C. for about 3 additional hours. Vacuum was applied to remove excess acid overhead. When the acid value was less than 1.0 mgKOH/g, the mixture was cooled to 80° C. Residual acidity was neutralized with alkali. The viscosity at 40° C. was 261 cSt and at 100° C. was 21.0 cSt. Approximately 75 grams of a technical pentaerythritol ester of valeric and isononanoic acids was added and the product was dried and filtered.

A complete analysis of the product after filtering was as follows:

Acid value=<0.01 mg KOH/g
Blue Soap=0.0 ppm
Viscosity @ 100° C.=19.2 cSt
Viscosity @ 40° C.=223 cSt
Viscosity Index=97
Pour Point=−25° F. (−32° C.)
Flash Point=515° F. (268° C.)
Moisture=367 ppm
Density @ 60° F. =8.178 lbs./gal.
APHA Color=300

The resulting product showed satisfactory miscibility with R-134a refrigeration fluid.

EXAMPLES 2–5

The procedure of Example 1 was followed to prepare a high viscosity ester base stock of ISO 220 grade from monopentaerythritol and an acid mixture of the following amounts of valeric acid and isoC$_9$ acid.

|         | Acid Mixture (mole %) |           |
| ------- | --------------------- | --------- |
| Example | % C$_5$               | % isoC$_9$ |
| 2       | 100                   | 0         |
| 3       | 75                    | 25        |
| 4       | 50                    | 50        |
| 5       | 0                     | 100       |

EXAMPLE 6

The resulting ester base stocks of Examples 1 to 5 were mixed at 15 weight percent with R-134a refrigeration fluid. All were fully miscible at room temperature. The miscible ranges were as follows:

|         | Acid Mixture (mole %) | | Miscible Range |
| ------- | ------- | --------- | --------------- |
| Example | C$_5$   | isoC$_9$  | ° C.            |
| 2       | 100     | 0         | −23 to 53       |
| 3       | 75      | 25        | −3 to 53        |
| 4       | 50      | 50        | −8 to >60       |
| 1       | 22      | 78        | −8 to >60       |
| 5       | 0       | 100       | +3 to >60       |

It will thus be seen that the objects set forth above, among those made apparent from the preceding description, are efficiently attained and, since certain changes may be made in the above compositions of matter without departing from the spirit and scope of the invention, it is intended that all matter contained in the above description shall be interpreted as illustrated and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A high viscosity synthetic polyneopentylpolyol ester lubricant base stock, comprising the reaction mixture formed by reacting a neopentylpolyol having less than 10 carbon atoms with at least one monocarboxylic acid selected from the group consisting of linear monocarboxylic acids having from 4 to 10 carbon atoms and branched chain acids having from 5 to 10 carbon atoms, the linear acid representing at least 15 mole per cent of the acid mixture, in the presence of an excess of hydroxyl groups, and an acid catalyst to form polyneopentylpolyol partial esters, neutralizing the acid catalyst; and reacting the partial polyneopentylpolyol esters with at least one monocarboxylic acid selected from the group consisting of linear acids having from 4 to 10 carbon atoms, and branched chain acids having from 5 to 10 carbon atoms, the resulting polyneopentylpolyol ester having a viscosity from about 68 to 400 cSt at 40° C.

2. The base stock of claim 1, wherein the polyneopentylpolyol partial ester is formed in the presence of an excess of hydroxyl groups in a mole ratio of carboxyl groups to hydroxyl groups in the reaction mixture in a range from about 0.25:1 to about 0.50:1; and the partial polyneopentylpolyol esters are reacted with an excess of about 15 weight percent of acid to yield the final ester base stock.

3. The base stock of claim 1, wherein the polyneopentylpolyol ester is formed from a polyneopentylpolyol partial ester which is formed from a neopentylpolyol represented by the following structural formula:

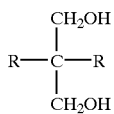

wherein each R is selected from the group consisting of —$CH_3$, —$C_2H_5$, and —$CH_2OH$.

4. The base stock of claim 3, wherein the neopentylpolyol is a polyol selected from the group consisting of pentaerythritol, trimethylolpropane, trimethylolethane, neopentyl glycol, and mixtures thereof.

5. The base stock of claim 3, wherein the neopentylpolyol is pentaerythritol.

6. The base stock of claim 1, wherein the linear acid reacted with the neopentylpolyol is valeric acid.

7. The base stock of claim 1, wherein the branched chain acid reacted with the neopentylpolyol is a nine carbon atom acid.

8. The base stock of claim 7, wherein the branched chain acid is 3,5,5-trimethylhexanoic acid.

9. The base stock of claim 1, wherein the linear acid reacted with the polyneopentylpolyol partial ester is valeric acid.

10. The base stock of claim 1, wherein the branched chain acid reacted with the polyneopentylpolyol partial ester is a nine carbon atom acid.

11. The base stock of claim 10, wherein the branched chain acid is 3,5,5-trimethylhexanoic acid.

12. A method of preparation of high viscosity synthetic polyneopentylpolyol ester lubricant base stocks, comprising:

reacting a neopentylpolyol having less than 10 carbon atoms with at least one monocarboxylic acid selected from the group consisting of linear monocarboxylic acids having from 4 to 10 carbon atoms and branched chain acids having from 5 to 10 carbon atoms, the linear acid representing at least 15 mole per cent of the acid mixture, in the presence of an excess of hydroxyl groups, and an acid catalyst to form partial polyneopentylpolyol esters, neutralizing the acid catalyst; and reacting the partial polyneopentylpolyol esters with at least one monocarboxylic acid selected from the group consisting of linear acids having from 4 to 10 carbon atoms, and branched chain acids having from 5 to 10 carbon atoms, and the resulting polyneopentylpolyol ester having a viscosity from about 68 to 400 cSt at 40° C.

13. A method of preparation of high viscosity synthetic polyneopentylpolyol ester lubricant base stocks, comprising reacting a neopentylpolyol having less than 10 carbon atoms with a monocarboxylic acid mixture of (i) at least one linear monocarboxylic acid having from 4 to 10 carbon atoms, and (ii) at least one branched chain monocarboxylic acid having from 5 to 10 carbon atoms, the linear acid representing at least 15 mole per cent of the acid mixture, in the presence of an excess of hydroxyl groups and an acid catalyst to form polyneopentylpolyol partial esters, neutralizing the acid catalyst; and reacting the partial polyneopentylpolyol partial esters with a monocarboxylic acid mixture of (i) at least one linear monocarboxylic acid having from 4 to 7 carbon atoms, and (ii) at least one branched chain monocarboxylic acid having from 6 to 10 carbon atoms, the resulting polyneopentylpolyol ester having a viscosity from about 68 to 400 cSt at 40° C.

14. A refrigeration compressor fluid comprising, a highly or fully fluorinated refrigerant and between about 5 to 20 weight percent of a high viscosity synthetic polyneopentylpolyol ester lubricant including a polyneopentylpolyol ester reaction mixture formed by reacting a neopentylpolyol having less than 10 carbon atoms with at least one monocarboxylic acid selected from the group consisting of linear monocarboxylic acids having from 4 to 10 carbon atoms and branched chain acids having from 5 to 10 carbon atoms the linear acid representing at least 15 mole per cent of the acid mixture, in the presence of an excess of hydroxyl groups, and an acid catalyst to form partial polyneopentylpolyol esters, neutralizing the acid catalyst; and reacting the partial polyneopentylpolyol esters with at least one monocarboxylic acid selected from the group consisting of linear acids having from 4 to 10 carbon atoms, and branched chain acids having from 5 to 10 carbon atoms, the resulting polyneopentylpolyol ester having a viscosity from about 68 to 400 cSt at 40° C.

15. A high viscosity synthetic polyneopentylpolyol ester lubricant base stock, comprising the reaction mixture formed by reacting a neopentylpolyol having less than 10 carbon atoms with (1) at least one linear monocarboxylic acid having from 4 to 10 carbon atoms and (2) at least one branched chain monocarboxylic acids acid having from 5 to 10 carbon atoms, the linear acid representing at least 15 mole per cent of the acid mixture, in the presence of an excess of hydroxyl groups, and an acid catalyst to form polyneopentylpolyol partial esters, neutralizing the acid catalyst; and reacting the polyneopentylpolyol partial esters with at least one monocarboxylic acid selected from the group consisting of linear acids having from 4 to 10 carbon atoms, and branched chain acids having from 5 to 10 carbon atoms, the resulting polyneopentylpolyol ester having a viscosity from about 68 to 400 cSt at 40° C.

16. The base stock of claim 1, wherein the acid reacted with the neopentylpolyol is a mixture of a linear acid and a branched chain acid in a mole ratio between about 5:1 to 1:5.

17. The base stock of claim 16, wherein the mole ratio is between about 1:1 to 1:4.

18. The base stock of claim 16, wherein the mole ratio is between about 1:3 to 1:4.

19. The base stock of claim 17, wherein the linear acid is valeric acid and the branched acid is 3,5,5-trimethylhexanoic acid.

20. The base stock of claim 18, wherein the linear acid is valeric acid and the branched acid is 3,5,5-trimethylhexanoic acid.

* * * * *